Figure 2:
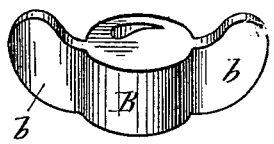

(No Model.)

I. W. LITCHFIELD.
BINDING DEVICE FOR ELECTRIC APPARATUS.

No. 361,705. Patented Apr. 26, 1887.

WITNESSES.
J. M. Dolan,
Fred. B. Dolan.

INVENTOR.
Isaac W. Litchfield
by his attys
Clarke & Raymond.

N. PETERS, Photo-Lithographer, Washington, D. C.

UNITED STATES PATENT OFFICE.

ISAAC W. LITCHFIELD, OF WARWICK, ASSIGNOR OF ONE-HALF TO PHILIP K. DUMARESQ, OF NEW YORK, N. Y.

BINDING DEVICE FOR ELECTRIC APPARATUS.

SPECIFICATION forming part of Letters Patent No. 361,705, dated April 26, 1887.

Application filed August 16, 1886. Serial No. 210,973. (No model.)

*To all whom it may concern:*

Be it known that I, ISAAC W. LITCHFIELD, of Warwick, in the county of Orange and State of New York, a citizen of the United States, have invented a new and useful Improvement in Binding Devices for Electric Apparatus, of which the following is a full, clear, and exact description, reference being had to the accompanying drawings, forming a part of this specification, in explaining its nature.

The invention comprises a device for quickly and securely fastening an electric wire to a zinc stud, post, or other part of an electrical device or machine, and it comprises, in substance, a collar having an opening large enough to receive the end of the zinc post, stud, or other device, and the electric wire, which opening is so fashioned or shaped that upon turning the collar upon the zinc end of the post, stud, or other device the wire is caused to be firmly clamped to the zinc post, stud, or other device, and held locked thereto.

In the drawings I have represented the device as used in connection with a zinc of galvanic battery.

Figure 3:
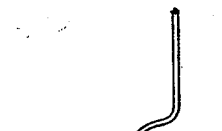
Figure 4:
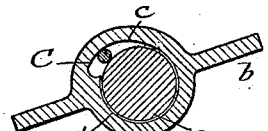
Figure 6:
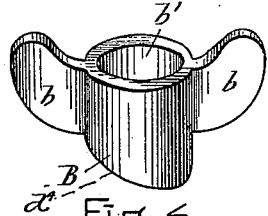
Figure 5:
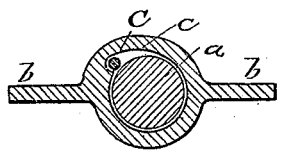
Figure 7:
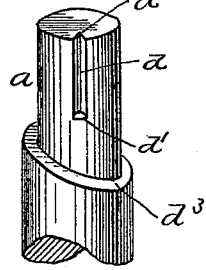
Figures 8, 9:
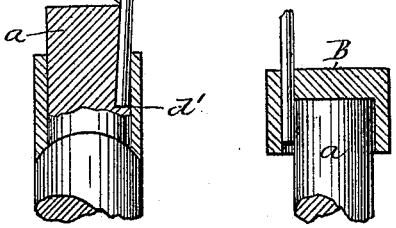
Figure 8:
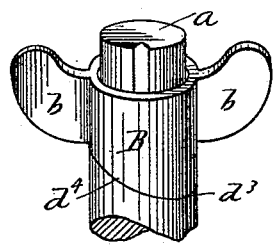
Figure 10:
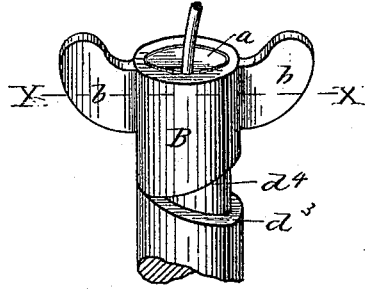
Figure 12:
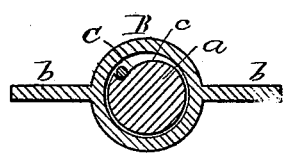
Figure 11:

Figure 1 is a view in perspective of a zinc provided with my attachment. Fig. 2 is a view in perspective, enlarged, of the clamping-collar. Fig. 3 is a horizontal section through it and the head of the zinc and connecting-wire, showing the position of the wire before the turning of the collar to clamp it to the head or upper end of the zinc. Fig. 4 is a view on the same section, showing the position of the parts after the collar has been turned to clamp the wire to the head of the zinc. Fig. 5 is a vertical section of these parts. Fig. 6 is a view in perspective of a collar of modified form. Fig. 7 shows in perspective the head or end of the zinc prepared for use with the collar represented in Fig. 6. Fig. 8 shows the collar represented in Fig. 6 in place upon the head shown in Fig. 7. Fig. 9 is a view, part in vertical section and part in elevation, to further illustrate the operation of this modification. Fig. 10 is a view in perspective thereof. Fig. 11 is a horizontal section upon the line $x\ x$ of Fig. 10. Fig. 12 is a view representing in horizontal section a modified form of construction, to which reference is hereinafter made.

A represents the zinc. $a$ is its upper end. B is a collar, preferably having the arms or extensions $b$ and the hole $b'$, which has the eccentric cavity C. The collar may have the opening $b'$ extending entirely through it, or it may be partially closed at the top, as shown in Figs. 1 and 2. The eccentric section C extends, however, entirely through the cap, and has an inclined or wedge surface, $c$. This forms a pocket or recess deeper at one end than at the other, the wedge or inclined surface gradually drawing in and finally uniting with the circular surface of the hole $b'$.

In use the collar is placed upon the head or end $a$ of the zinc, the end of the connecting-wire or electric conductor placed in the large part of the recess C, and the collar turned until the inclined or wedge surface $c$ is brought to bear upon the wire to press it firmly against the side of the head or end $a$. If desired, this clamping effect of the wedge surface of the cap upon the wire can be produced, as represented in Figs. 6 to 11, inclusive. When this form of construction is employed, however, the clamping effect is produced by the endwise movement of the collar upon the post or end of the zinc, as well as by the partial rotation thereof. To accomplish this the zinc head or end is provided with a recess, $d$, which is deeper at its lower end, $d'$, than at its upper end, $d^2$. The zinc head or end also has the inclined surface $d^3$. The collar has the inclined surface $d^4$, which is the reverse of the incline $d^3$ and the hole $b'$.

In use the collar is slipped upon the end of the zinc, the wire placed in the hole $d$, and as the hole $d'$ is deeper at its lower end than at its upper end, (see Fig. 9,) the wire is caused to form an inclined surface upon the post, and the collar upon being rotated moves upward upon this incline and securely binds or clamps the wire to the end of the zinc.

This form of binding device is applicable wherever an electric wire is joined to another electric conductor, whatever its use may be, whether it be a zinc or whether it be a post, stud, or any other part of an electric battery, device, machine, or instrument.

It is obvious of course that the inclined or wedge surface $d^4$ is an equivalent for the wedge surface $c$, in that the collar is moved upon the end of the wire thereby, and caused to clamp and lock it to the head of the zinc. It is also obvious that the head of the zinc may be provided with a pocket or recsss having an inclined surface, and that the collar may have a round hole, without departing from the spirit of my invention, as from the movement of the collar upon the head the end of the wire would be clamped between its inner surface and the surface of the head of the zinc. This form of construction I have represented in Fig. 10.

Having thus fully described my invention, I claim and desire to secure by Letters Patent of the United States—

1. A binding device for fastening electric wires to zincs and for other similar purposes, comprising the collar B, having the hole $b'$, the inclined or wedge surface, and the turning extensions $b$, substantially as described.

2. The collar or binding device for electric conductors and other purposes, having the cap, the hole $b'$, and the hole $c$, having inclined or wedge surface, substantially as described.

ISAAC W. LITCHFIELD.

Witnesses:
CHAS. EDGAR MILLS,
E. J. BUNKER.